Patented Apr. 24, 1934

1,955,849

UNITED STATES PATENT OFFICE 1,955,849

SUSPENSIONS, AND METHOD OF PRODUCING SAME

James A. Finley, Ontario, Calif., assignor to California Fruit Growers Exchange, Los Angeles, Calif., a corporation of California No Drawing. Application January 2, 1931
Serial No. 506,318

21 Claims. (Cl. 99—11)

This invention relates to stable suspensions in which substantially insoluble solid or solids are suspended in a liquid medium. The invention also pertains to methods by means of which substantially insoluble solids may be caused to remain in stable suspension in a liquid medium.

The invention particularly relates to the preparation of liquid products containing plant juices and plant solids, these solids being in stable suspension in the juices, or in additional liquid media. By the term "plant juices" reference is made to the juices of fruits and vegetables such as, for example, citrus fruit juices, berry juices, tomato juice, etc. Such plant juices and products made therefrom are used to a considerable extent as beverages and food products.

Among products of this character which are popular at the present time are those types of products which have present some proportions of relatively insoluble matter generally derived from the plant, fruit or vegetable from which the juices have been obtained. These pulpy types of fruit products are often used as beverages, syrups, etc. and may be produced in concentrated form or in more dilute form. The dilution may include the addition of aqueous liquids or solutions, sugar, additional flavoring matter, coloring matter and/or preservatives.

For the purpose of facilitating easy understanding of this invention, reference will be more particularly made hereafter to fruit juice products which contain considerable proportions of insoluble material such as fruit pulp; for example, citrus fruit syrups and beverages containing appreciable quantities of fragmentary portions of the fruit, such as juice sacs, portions of the pulp and even portions of the skin. These insoluble solid particles are readily visible and impart a characteristic color and consistency to the product which is readily recognized by the purchaser or consumer. These products have the appearance of an unstrained juice freshly prepared from the fruit in question. The various advantages of these characteristics, including the appeal of such an appearance to the purchaser or consumer, are obvious.

It is well known that in freshly prepared unstrained juices the macroscopic insoluble solids present are more or less uniformly distributed or suspended throughout the whole product. In commercial products, however, there is a marked tendency for the insoluble matters present to segregate, either floating at or near the surface or settling toward the bottom, thereby leaving a comparatively clear portion that is unoccupied by macroscopic suspended particles. As products of this character and particularly syrups and beverages are generally dispensed from glass containers, the segregation of solids creates an undesirable appearance. Furthermore, where portions of the product are removed from the container from time to time, as by drawing off at the bottom, it is plain that the various portions thus removed will contain widely varying amounts of the solids. Some portions may consist essentially of pulpy matter, while others may be composed almost entirely of clear fluid. When these characteristics are kept in mind, it is readily understood that retailers dispensing citrus fruit syrups or beverages encounter numerous difficulties, the variation in character of the beverage and its unattractive appearance detracting considerably from the salability of the material. Some retailers have attempted to overcome the difficulties described hereinabove by periodically shaking or agitating the containers but they ordinarily are so unfavorably impressed by the necessity of such periodic shaking, that they make no attempt to continue the practice and thus increase their sales, and very often altogether refuse to handle the product. Attempts to correct these difficulties have been made by adding various gums to the beverage but these gums do not effectively prevent separation and, furthermore, increase the viscosity of the product to a point that makes dispensing difficult and the product not as palatable.

It has been found that substantially stable suspensions of insoluble matter in liquid media can be produced without the necessity of adding gums or periodically shaking the containers. It has been found that stable suspensions of insoluble solid matter in liquid media can be produced by incorporating in the product a suitable material which is readily capable of assuming colloidal form. Such materials are ordinarily spoken of as "colloids" and it has been found that the colloids which are effective are those capable of forming gels.

Furthermore, it has been discovered that the stability of the resulting suspension is apparently due to the presence of discontinuously associated gel particles.

It is an object of this invention to disclose and provide a method of producing stable suspensions of substantially insoluble solids in liquid media.

Another object is to disclose and provide a method of producing stable suspensions of substantially insoluble solids in liquid media by forming discrete particles of gel in the suspension.

A further object of this invention is to provide a method of increasing the utility of plant juice products by improving the appearance thereof by greatly retarding or inhibiting the tendency of such plant juice products to separate into dissimilar layers or portions.

Another object of this invention is to disclose and provide a method of producing stable suspensions by incorporating colloids in a novel manner in mixtures of liquid media and substantially insoluble particles.

An object of this invention is to disclose and provide a liquid product in which substantially insoluble solids are held in suspension.

Yet another object of this invention is to provide a uniform and relatively permanent suspension of insoluble particles in a liquid medium, such suspension containing a suitable colloid in dispersed gel form.

Another object of this invention is the stabilization of solid-liquid mixtures by the use of a gel-forming colloid dispersed therein.

Other objects, uses and advantages of this invention will be in part obvious and in part will appear from a contemplation of the invention as set forth herein and in the appended claims.

Although as has been stated hereinabove, the invention generally relates to all instances where it is desired to produce a stable suspension of an insoluble material in a liquid, the succeeding detailed description will be particularly directed toward the application of the invention to the production of stable suspensions including plant juices and plant solids.

The invention is not to be limited to the specific examples given hereinafter since in actuality it has a very wide application.

As has been stated hereinabove, this invention contemplates the maintaining of substantially insoluble particles in comparatively uniform suspension in liquid media by incorporating a colloid therein. This result is more effectively produced if the colloid is added in the form of a mechanically dispersed gel. The resultant product, therefore, contains a discontinuously associated gel, the various particles thereof apparently exerting the desired effect upon the solids. Preferably, a material is employed which will readily form a gel under easily produced and controlled conditions. Among colloids which will do this and which are readily obtained commercially, mention may be made of agar, gelatin and pectin. Furthermore, these materials are edible, may be obtained in a sufficiently pure state, and are easily caused to form gels. Obviously, inedible gel-forming colloids can be used in the preparation of products which are not intended to be eaten.

The gels particularly adapted for the purposes of the following specific examples of this invention should be tender and elastic, that is, they should preferably have a low surface strength but a relatively high tensile strength or deformability. When pectin is used as the colloid, the gel made therefrom may contain all or part of the sugar, if any, that is to go into the final product as well as a part or all of the acid. Gels may be made with agar, gelatin or other colloids with aqueous material only but preferably sugar, glycerine or some other material or agent is employed in making the gel when the resultant gel is to be of greater elasticity. The aqueous phase of the gel may be water or part of the fruit juice to be used in the final product, such as a fruit juice syrup.

For example, it may be desired to employ the invention in the preparation of a citrus syrup which is ordinarily dispensed commercially by being mixed with either plain or carbonated water, milk or other suitable material. Such a product may be either produced in very concentrated form to be later diluted by the retailer with a suitable liquid to which additional flavoring, coloring or preservative may be added, or it may be of only sufficient concentration to form a beverage when diluted with from two to five parts of water.

A citrus juice syrup of the character described hereinabove may be prepared in accordance with this invention by making a tender, elastic gel containing the desired amount of the chosen colloid. When the gel has set properly, it may then be mixed with and dispersed in the fruit juice and/or juice concentrate containing the pulpy or insoluble matter, sugar, water and any other desired ingredients. The dispersed gel particles are separate and distinct from the major proportion of the insoluble macroscopic solids.

Mechanical means of agitation may be employed and the product, if desired or necessary, is then de-aerated before being packaged in the desired containers. It has been found that under some conditions air may be beaten into the product by the action of the agitating means and if appreciable amounts of air remain in the packaged product, small bubbles of air may adhere to particles of the insoluble material and cause these particles to rise toward the top of the container. De-aeration may be attained merely by a suitable form of agitation of the final container, such as rolling of kegs or barrels or shaking of jugs to dislodge the air bubbles and reconstitute the relatively uniform distribution or dispersion of the insoluble particles, which will then remain stable, or such de-aeration may be obtained by carrying out the mixing with the gel under conditions of partial vacuum.

Those skilled in the art will realize that the proportions of ingredients in the original gel will ordinarily vary according to the size of the batch of final product being made. Ordinarily, the gel can be prepared directly in the kettle or other apparatus in which the final syrup is to be prepared. As has been stated hereinabove, a gel is preferably prepared which will be elastic yet rather tender and easily broken up. If the container is a large one, some ingredient of the gel batch may need to be present in a different proportion from that used for a smaller container. It is well known that ordinarily a jelly batch which will set to a given texture in a large container will set to a firmer texture in a smaller container.

If a small quantity of gel of a desired consistency has been made and it is now desired to make a larger batch of a similar gel, it may be necessary to either increase the proportion of sugar or the acidity (when pectin is employed) in order to develop the same characteristics in the larger batch. Decreasing the aqueous phase will accomplish the same result when any gel-forming colloid is employed.

Furthermore, it should be remembered that under comparable conditions the quantity of colloid necessary to produce a satisfactory suspension of the insoluble solids is influenced by the quantity of dissolved solids present in the medium. For example, the percentage of colloid necessary for satisfactory suspension of insoluble solids will be generally decreased by an increase in the proportion of dissolved solids.

For purposes of illustration, specific examples are given hereinafter but it is to be understood that such examples are merely illustrative of the application of this invention and are not in any sense indicative of the limits of its scope. The various ingredients may be altered or varied depending upon the presence of other ingredients and the character of the liquid medium and of the solids which it is desired to suspend.

In preparing lemon syrup, it has been found that the following proportions give satisfactory results:

7½ oz. of 160 grade pectin
40 lbs. of sugar
3.33 gals. of hot water
8 oz. citric acid crystals are made into a jelly in a known way in a container or kettle sufficiently large to finish 10 gals. of syrup. When this batch has set to a gel, the following ingredients may be added:

1.25 gals of lemon juice containing considerable amounts of lemon pulp;
1.25 qts. of a commercial concentrated lemon juice (which is prepared by concentrating fresh lemon juice to a point where it contains approximately 27% of anhydrous citric acid);
10 lbs. of sugar; and
sufficient water to make 10 gals.

The jelly is then thoroughly mixed with the other ingredients so as to break up the jelly and disseminate it or disperse it in the form of particles uniformly throughout the mixture. The resultant product may be suitably packaged and it will be found that the lemon solids will remain in suspension for prolonged periods of time without showing any tendency to separate from the liquid medium. This product will contain about 0.75 ounces of 160 grade pectin per gallon of the finished syrup.

An equally satisfactory grapefruit or orange syrup could be made with the above gel base by substituting suitable grapefruit or orange material for the lemon products mentioned hereinabove. Additional coloring, flavoring or preservative materials may be added if desired.

A somewhat different type of syrup, also prepared from citrus juices, may be made as follows:

A gel base is prepared in a known way, such gel containing 0.6 gals. of water, 2 oz. of crystalline citric acid, 8 lbs. of sugar, and 1 oz. of 100 grade pectin. This gel may then be mixed with 3.75 gals. of fresh orange juice, 2.5 qts. of a commercial concentrated orange juice (which may be prepared by concentrating fresh orange juice 6 to 1), 8 oz. of citric acid crystals, 48 lbs. sugar, and sufficient water to make 10 gals. These ingredients are then suitably agitated so as to produce a liquid product containing dispersed gel particles adapted to maintain the solids in suitable suspension. The resultant syrup may then be packaged and the proportions given hereinabove produce a syrup containing 0.1 oz. of 100 grade pectin per gallon.

A satisfactory lemon or grapefruit syrup of similar type may be prepared by substituting suitable lemon or grapefruit material for the orange products given hereinabove.

In the above examples, specific reference has been made to the use of pectin for the reason that pectin is a natural constituent of fruits in general and therefore no objection can be raised against its use in fruit products. Gelatin, agar and other gel-forming colloids may be employed, however, and satisfactory suspensions may be made by the use of other gel-forming colloids.

Furthermore, the invention is not limited to the preparation of suspensions involving the use of fruit juices and fruit solids since the method may be employed in the preparation of any suspension involving a liquid medium and insoluble solids which it is desired to suspend in such medium.

Products of essentially similar physical characteristics may be prepared from a great variety of materials by the application of the method of this invention.

In the examples given hereinabove, the amount of gel-forming colloid employed varied from 0.1 oz. of 100 grade pectin per gallon to 0.75 oz. of 160 grade pectin, this latter proportion being equivalent to 1.2 oz. of 100 grade pectin per gallon. While these proportions are illustrative, they are not to be taken as limiting since under appropriate conditions either lesser or greater amounts may be required.

It will be obvious from the detailed description given above that products made in accordance with this invention are characterized by the presence therein of small particles of dispersed gel. In this connection, it may be mentioned that in the preparation of suspensions such as, for example, fruit solids, the mechanical breaking up of the gel by agitation should preferably not be sufficient to reduce the size of such fruit solids. Although the nature of the action of the phenomena involved is not fully understood, the essential characteristic for the maintenance of solid particles in substantially uniform suspension appears to be the presence of the dispersed gel particles which are necessarily discontinuous, yet are apparently interassociated, whereby they are referred to as being discontinuously associated.

It may also be stated that the efficacy of the process is not dependent upon increase in viscosity. It is known, of course, that solids move more slowly through a more viscous medium, but the effectiveness of the method of this invention is much greater than could possibly be accounted for by any concomitant increase in viscosity.

I claim:

1. A method of producing stable suspensions of substantially insoluble solids in liquid media comprising, forming a tender gel, mixing such gel with a liquid medium and substantially insoluble macroscopic solids which are desired in the final product to disrupt the gel, and agitating the mixture to form a stable suspension including discontinuously associated gel particles adapted to maintain said substantially insoluble macroscopic solids in suspension in said liquid medium.

2. A method of producing liquid citrus fruit juice products containing substantially insoluble solids in stable suspension comprising, mixing a gel-forming substance and fruit juices containing fruit solids to form a stable suspension containing discontinuously associated gel particles separate and distinct from the major proportion of insoluble solids, said gel particles being adapted to maintain said fruit solids in suspension in said juices.

3. A method of producing stable suspensions of substantially insoluble solids in liquid media comprising, forming a pectin gel, mixing such gel with a liquid medium and substantially insoluble solids which are desired in the final product, and agitating the mixture to form a stable suspension including discontinuously associated pectin gel particles adapted to maintain said substantially insoluble solids in suspension in said liquid medium.

4. A method of producing citrus fruit juice syrup comprising, forming a pectin gel, mixing such gel with an aqueous medium having citrus fruit solids in suspension and solution, and agitating the mixture to form discrete gel particles in the aqueous medium adapted to maintain insoluble citrus fruit solids in suspension.

5. A stable suspension of insoluble solids in a liquid medium, said suspension containing discontinuously associated gel particles, separate and distinct from the major portion of insoluble solids, adapted to maintain the insoluble solids in suspension.

6. A suspension of insoluble solids in a liquid medium containing discontinuously associated pectin gel particles adapted to maintain said insoluble solids in suspension.

7. A food product comprising a liquid medium, insoluble, macroscopic, edible solids in suspension therein, and discrete particles of a gel made with an edible colloid dispersed in said liquid medium whereby said edible solids are maintained in suspension, said gel particles being separate from the major portion of the insoluble solids.

8. A food product comprising a liquid medium, insoluble plant solids in suspension therein, and discrete particles of a gel made with an edible colloid dispersed in said liquid medium, said gel particles being separate from the major portion of insoluble solids and adapted to maintain said insoluble plant solids in suspension.

9. A food product containing an aqueous medium, insoluble macroscopic fruit solids suspended therein, and discontinuously associated gel particles made with an edible colloid dispersed in said liquid medium, and adapted to maintain said macroscopic fruit solids in suspension.

10. A food product comprising a liquid medium, insoluble edible solids suspended therein and discontinuously associated pectin gel particles dispersed in said liquid medium and adapted to maintain said edible solids in suspension.

11. A fruit juice syrup comprising an aqueous medium containing sugar and fruit materials in solution, insoluble fruit solids suspended in said aqueous medium, and particles of a gel made with an edible colloid dispersed in said medium, said gel particles being separate from the major portion of the insoluble solids, whereby said insoluble solids are maintained in relatively uniform suspension.

12. A citrus fruit juice syrup comprising, an aqueous medium having citrus fruit juices and materials in solution and citrus fruit insoluble solids in suspension, said product containing dispersed particles of a pectin sugar gel adapted to maintain said insoluble citrus fruit solids in suspension.

13. A mobile food product comprising a liquid medium, macroscopic solids in the liquid medium, and particles of a gel made with an edible colloid, said gel particles being separate and distinct from the major portion of macroscopic solids and adapted to maintain said solids in suspension.

14. A beverage base comprising a liquid medium, macroscopic solids in the liquid medium, and particles of an agar gel dispersed in the liquid medium, said agar gel particles being separate and distinct from the major portion of macroscopic solids and adapted to maintain said solids in suspension.

15. A beverage base comprising a liquid medium, macroscopic solids in the liquid medium, and particles of a gelatin gel dispersed in the liquid medium, said gelatin gel particles being separate and distinct from the major portion of macroscopic solids whereby said solids are maintained in substantially stable suspension.

16. A method of producing substantially stable suspensions of substantially insoluble macroscopic solids comprising forming in a liquid medium containing substantially insoluble macroscopic solids discrete gel particles of a gel forming substance, whereby said insoluble macroscopic solids are maintained in suspension in said liquid medium.

17. A method of producing substantially stable suspensions of substantially insoluble macroscopic plant solids in plant juice comprising forming in plant juice containing substantially insoluble macroscopic plant solids discrete gel particles of a gel forming substance whereby said solids are maintained in suspension in said juice.

18. A method of producing substantially stable suspensions of substantially insoluble macroscopic fruit solids in fruit juice comprising forming in fruit juice containing substantially insoluble macroscopic fruit solids discrete gel particles of a gel forming substance whereby said solids are maintained in suspension in said juice.

19. A method of producing substantially stable suspensions of substantially insoluble macroscopic citrus fruit solids in citrus fruit juice comprising forming in citrus fruit juice containing substantially insoluble macroscopic citrus fruit solids discrete gel particles of a gel forming substance whereby said solids are maintained in suspension in said juice.

20. A method of producing substantially stable suspensions of substantially insoluble macroscopic fruit solids comprising forming in a liquid medium containing sugar and fruit materials in solution, and also substantially insoluble macroscopic fruit solids, discrete gel particles of a gel forming substance whereby said insoluble macroscopic solids are maintained in suspension in said liquid medium.

21. A method of producing substantially stable suspensions of substantially insoluble macroscopic citrus fruit solids comprising forming in a liquid medium containing sugar and citrus fruit materials in solution, and also substantially insoluble macroscopic citrus fruit solids, discrete gel particles of a gel forming substance whereby said insoluble macroscopic solids are maintained in suspension in said liquid medium.

JAMES A. FINLEY.